Jan. 24, 1956 C. L. HARE 2,732,430

COIN CONTROL ATTACHMENT FOR DIAL TELEPHONES

Filed May 27, 1952 3 Sheets-Sheet 1

INVENTOR.
CHARLES L. HARE
BY
G. T. Dowling

COIN CONTROL ATTACHMENT FOR DIAL TELEPHONES

Filed May 27, 1952 3 Sheets-Sheet 2

INVENTOR.
CHARLES L. HARE
BY
J. T. Dowling

INVENTOR.
CHARLES L. HARE
BY
J. T. Dowling

United States Patent Office
2,732,430
Patented Jan. 24, 1956

2,732,430

COIN CONTROL ATTACHMENT FOR DIAL TELEPHONES

Charles L. Hare, Baltimore, Md.

Application May 27, 1952, Serial No. 290,184

1 Claim. (Cl. 179—6.3)

The present invention relates to a manually operated coin control attachment for dial telephone hand sets.

Another object of the present invention is the provision of an attachment wherein the dialing of a given number through the medium of a dial telephone is prohibited unless a proper coin is inserted in the attachment to permit the dialing thereof.

Another object of the present invention is the provision of a manually operated attachment for dial operated telephones, wherein the connection is made by the use of a coin, thus eliminating the promiscuous use of a contract telephone unless a proper fee is received.

A still further object of the present invention is the provision of a dial telephone attachment that is easily operated and understood by all who wish to make a call and have the proper coin for payment before said call can be made.

A still further object of the present invention is the provision of an improved manually operated attachment having a coin operating mechanism and a locking pin operated thereby, this invention being controlled by the movement of the coin mechanism so that no unauthorized call can be made unless a coin is inserted for payment thereof.

Another and important object of the present invention is the provision of a coin receiving box, wherein all coins are received as the calls are made and can only be reclaimed by the proper authority or the owner of a dial telephone using said attachment.

A still further object of my invention is the provision of an attachment that is inexpensive to manufacture and install on all types of models of the present hand type dial telephone.

Other objects of the invention will be apparent by reference to the accompanying drawings and detailed description in which like reference numerals are applied to all parts in the several views of the drawings.

Figure 1:
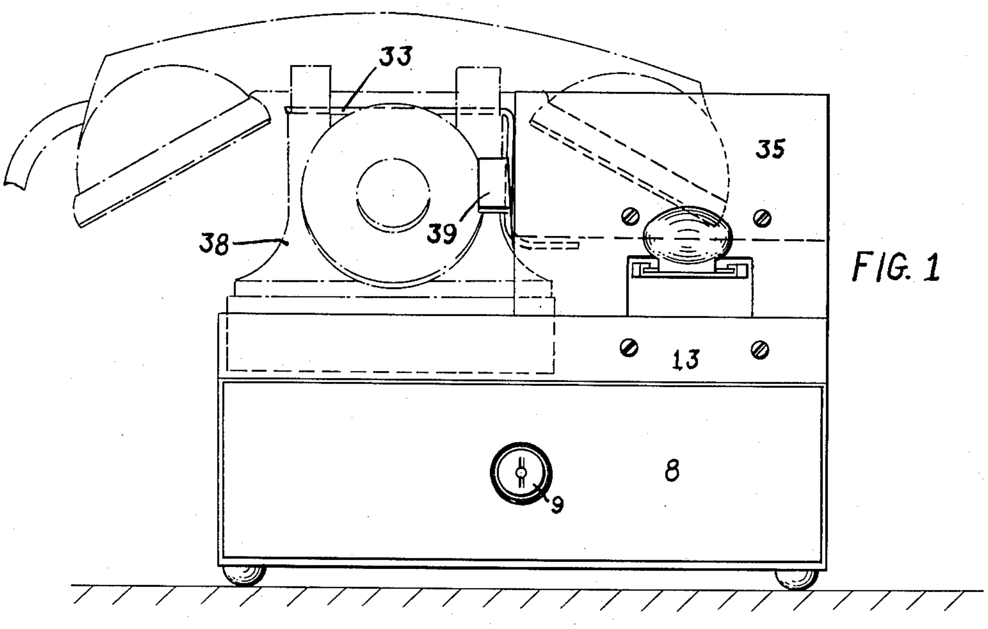
Figure 1 is a front elevation of my attachment and its association with a dial telephone.
Figure 2:
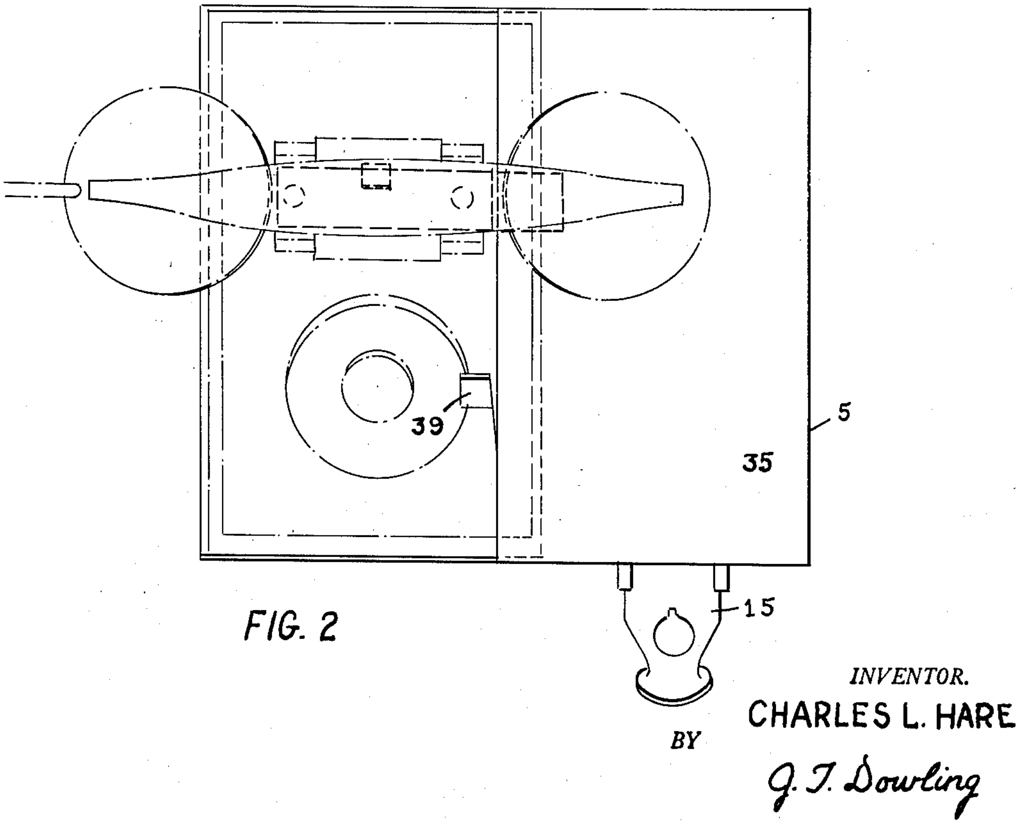
Figure 2 is a top plan view of Figure 1.

It is the aim of the present invention to provide an atachment for hand set telephones which will positively eliminate the promiscuous and unauthorized free use of the telephone when a call is to be placed, without the same being paid for. It is a well known fact that contract dial telephones are in many places, such as garages, stores, offices, etc., and in all instances or at least the majority, the telephone is used without any compensation, also rendering it embarrassing to the owner of the telephone to ask for payment after the call has been made. By the use of my invention, all of this is eliminated. The device is quickly installed in conjunction with a hand set telephone, and before it can be used a coin must be inserted and then the call can be completed, but it has been paid for without any embarrassment to any one. This definitely eliminates the use of the telephone without payment.

Referring to the drawings, the numeral 5 indicates a supporting box structure having a coin receiving compartment 6 in the bottom section thereof, and the compartment is closed by a hinged door 8 having a key lock 9 therefor, so that said compartment can be kept locked and against unauthorized entry.

The supporting box 5 has a partition 10 across its upper side of its top wall and secured to this partition is a shield member 11, the shield being provided near one outer edge and near its top with a pin receiving opening 12, the purpose of which will be hereinafter described.

A supporting strip 13 is secured to the front edge of the box on the top wall and secured to said strip 13 is a coin controlling mechanism 14 having the usual coin operating slide bar 15, and the slide bar being the only part of said mechanism that is changed from its usual form to meet the requirements of the present invention.

The portion of the top of the box 5 also constitutes a rest for a hand set telephone so that it can be associated with the coin controlling mechanism.

The slide bar 15 is of standard equipment and has its inner side edge provided with spaced cutaway portions 16 and 17, respectively, these portions permitting said bar to be freely slid in and out of operating controlling position. The inner edge of the bar 15 is also provided with ratchet teeth 18 and the teeth are located between the cutaway portions 16 and 17, respectively.

Figure 3:
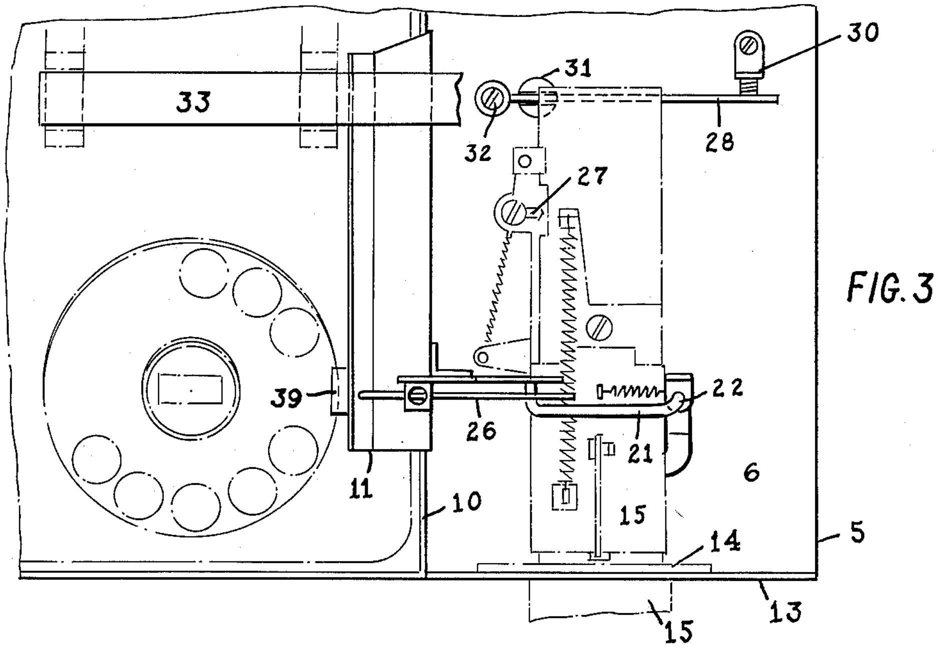
Figure 3 is a top plan view of the attachment with its cover removed, illustrating the coin control mechanism and the dial controlling means.
Figure 4:
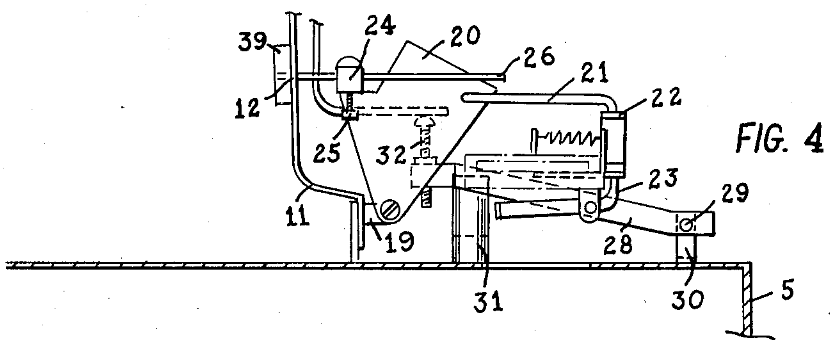
Figure 4 is an enlarged, fragmentary, sectional view, showing the operating parts for controlling the dial pin.
Figure 5:
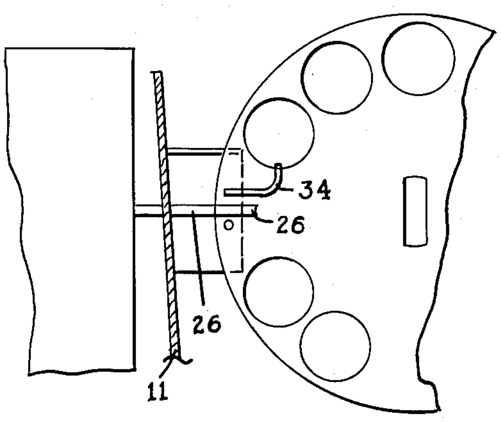
Figure 5 is a fragmentary, top plan view, partly broken away, of a telephone dial and the connections in use therewith.
Figure 6:
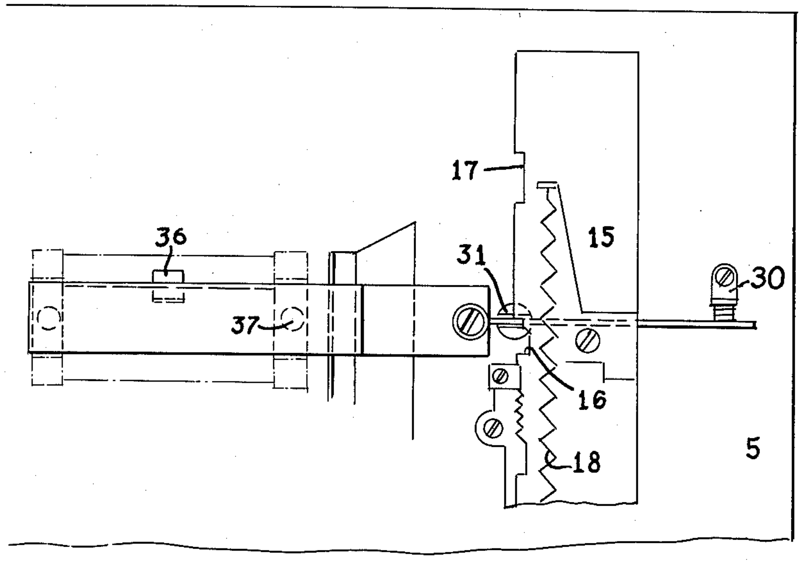
Figure 6 is a fragmentary, top plan view, partly broken away, illustrating the coin slide bar and its association with the dial operating means.
Figures 7, 8, 9:
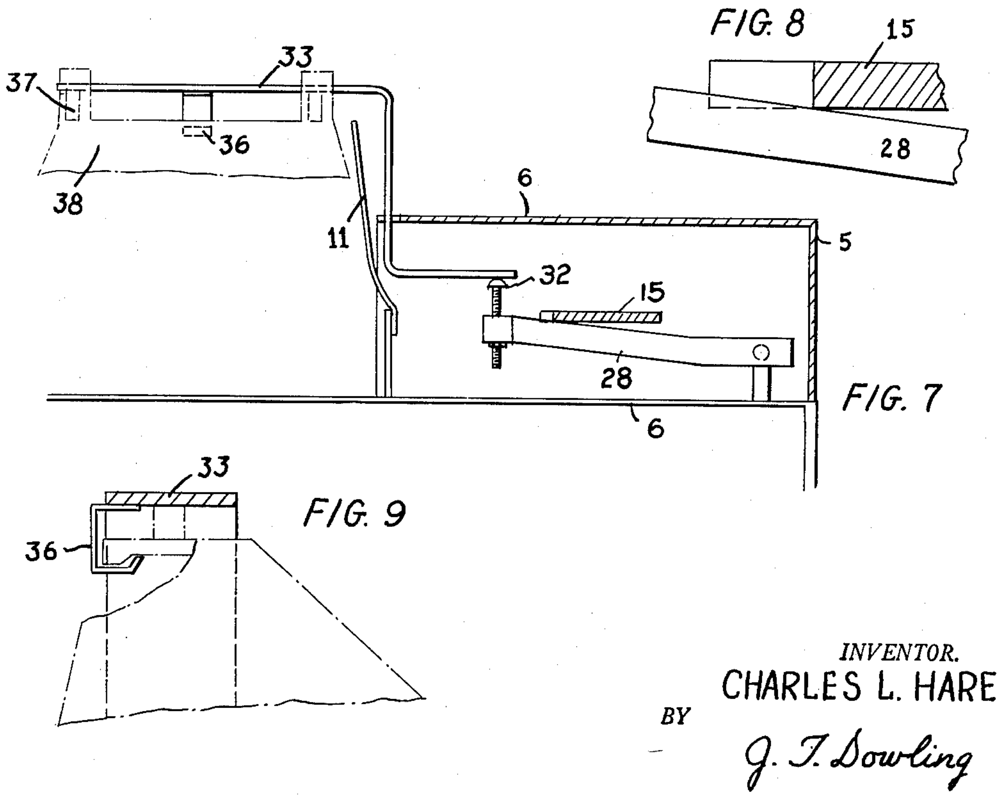
Figure 7 is a transverse sectional view, partly broken away, illustrating the releasing pin and its association with the operating bracket.
Figure 8 is a fragmentary view, partly broken away and in section, of the coin slide bar and supporting bracket of the releasing pin.
Figure 9 is a sectional view, partly broken away, illustrating the manner of attaching the releasing pin operating means to a hand set telephone.

Attached to the inner side of the shield member 11 and coin operating member is a bracket 19 having pivotally mounted thereon an operating segment 20 for movement towards and away from the shield member when the coin operating slide bar is operated. This segment 20 is provided with an opening in which one end of a supporting member 21 is secured, the free end of said member being secured to the coin operating mechanism, as at 22, as clearly shown in Figures 3 and 4 of the drawings.

The supporting member 21 is associated with the coin mechanism through a lever 23 to move the segment to and away from the shield member, the purpose of which will be hereinafter more fully described. Adjustably secured to the segment 20, at one upper end, is a boss 24 having arranged therein an adjustable screw 25, and mounted transversely through this boss is a dial-engaging pin 26, this pin being held therein transversely by virtue of the screw 25 after the pin has been placed through the boss. The end of the pin 26, opposing the face of the shield member 11, is movable into and out of the opening 12 therein when the slide bar is operated.

The slide bar 15, when the proper coin is placed therein, is movable inwardly which will withdraw the pin from the opening 12, permit the dial to be operated and a call made. When the call is completed and the hand piece replaced by action of the release pin, the slide bar moves outwardly to its normal position and the pin returns in the opening in the shield and in engagement with the dial and a further call cannot be made until another coin is inserted and the operation completed. Thus it can be seen that the movement of the slide bar 15 and by virtue of the supporting member 21 and segment 20, the pin 26 is moved into and out of operative position relative to the dial face of a hand set telephone.

Secured to the inner edge of the coin mechanism is a spring controlled pivoted dog 27, and this dog is movable into and out of engagement with the walls of the cutaway portion 16 of the slide bar 15, which permits the pin 26 to move out of engagement with the dial and be retained in that position until after the call has been made.

A releasing lever 28 is pivotally secured at one end, as at 29, to a post 30 mounted on the box 5, and its free end is freely movable between a bifurcated standard 31, and this lever 28 has arranged in its free end an adjustable releasing screw 32, the face of this screw having free engagement with one end of a bracket 33, which bracket is secured, as at 36, by a clamp 36' to a portion of a hand set telephone.

The present dial, or the movable numeral manipulated dial, is provided with a strip 34 which is engaged by the pin 26 to hold the same against movement for number dialing until said pin is withdrawn from contact therewith.

It is to be understood that any type of stop can be used, instead of a strip. It can be done by pegs or a hole, anything that will constitute a stop or engage the end of the pin until said pin is withdrawn.

A cover 35 is arranged to be fitted over the entire coin controlling mechanism with the exception of that portion of the slide bar which extends therefrom, as clearly shown in Figure 1 of the drawings.

The bracket 33 rests on the circuit pins 37 which are used on all hand sets, and this bracket is of such weight that it is held in raised position by these pins until the hand piece of the telephone is replaced in the cradle 38, and immediately upon placing the same therein it rests upon the bracket 33, moving the same downwardly, breaking the circuit, and moving the extended end of the bracket into contact with the releasing element 32, thus putting the coin slide bar back into position for the reception of another coin so that an additional call can be made.

Secured to the rear side of the shield is a guard member 39, and this member protects the pin 26 from being engaged by an instrument to release it from said shield so that the telephone can be dialed without inserting a coin. Any type of guard can be provided; this is shown to be one instance thereof.

In the operation of the device, it is only necessary to place a coin in the proper place on the slide bar, forcing the same inwardly until one cutaway portion, or the cutaway portion 17 drops behind the bar 28 and the dog 27 engages the cutaway portion 16. By this inward movement of the slide bar, the pin 26 is withdrawn from the stop 24 and the telephone can be dialed immediately upon replacing the hand piece back in the cradle on top of the bracket 33, the releasing pin is actuated and the bar moved back into operative position, which in turn moves the segment moving the pin back into dial engaging position and the telephone cannot be used until an additional coin is placed therein, as previously described.

It is to be understood that applicant does not want to be limited to any particular detail and that many changes may be made and resorted to in the drawings and structure without departing from the spirit and scope of the invention as claimed.

Having thus described my invention, what I claim as new is:

An attachment for dial telephone sets including a base and a one-piece transmitting and receiving unit adopted to be receivable within a cradle on the base for normally supporting the unit upon the base comprising, in combination, a relatively low supporting element for the telephone set having a portion of its upper surface in a horizontal plane and of such size as to conveniently accommodate the base of the set, means for securing the base to the supporting element, a coin operated control mechanism for the said dial positioned on the supporting element adjacent the area occupied by the telephone set and to one side thereof, a slidable pin carried by the control mechanism and movable relative to the edge of the dial, a coin carrying slide, means connecting the coin carrying slide with the pin for operating the same, the connecting means being such that when the coin slide is in its normal extended position the pin will be extended, holding means carried on the dial for engaging the pin when the pin is in its normal extended position, the coin slide being manually movable to an inwardly position when a coin is inserted in the slide withdrawing the pin from the dial holding means, a latch mechanism for holding the coin slide in its inwardly position, vertical movable means carried adjacent the cradle connected with the latch mechanism adapted to release the latch from the slide when depressed by the transmitting and receiving unit when placed in the cradle, whereby the slide moves to its normal withdrawn position moving the pin outwardly in engagement with the dial holding member.

References Cited in the file of this patent

UNITED STATES PATENTS

| | | |
|---|---|---|
| 1,362,464 | Baum et al. | Dec. 14, 1920 |
| 2,063,009 | Andriano | Dec. 8, 1936 |
| 2,073,508 | Williams | Mar. 9, 1937 |
| 2,206,147 | Zimmerman | July 2, 1940 |
| 2,301,363 | Bruck | Nov. 10, 1942 |